United States Patent [19]
Hayes, Jr.

[11] Patent Number: 6,002,927
[45] Date of Patent: Dec. 14, 1999

[54] METHOD AND APPARATUS FOR COOLING AN ELECTRONIC DEVICE AND GENERATING A VIBRATIONAL SIGNAL

[75] Inventor: John Joseph Hayes, Jr., Wake Forest, N.C.

[73] Assignee: Ericsson Inc., Research Triangle Park, N.C.

[21] Appl. No.: 08/960,237

[22] Filed: Oct. 29, 1997

[51] Int. Cl.⁶ ............................. H04B 1/08; H04B 1/03; H02K 9/00
[52] U.S. Cl. ..................... 455/351; 455/347; 455/575; 361/814; 310/50; 310/52
[58] Field of Search ..................... 455/347, 344, 455/351, 575, 90; 361/694, 695, 814; 310/15, 16, 40 R, 50, 52

[56] References Cited

U.S. PATENT DOCUMENTS

| | | | |
|---|---|---|---|
| 5,020,138 | 5/1991 | Yasuda et al. | 455/90 |
| 5,029,236 | 7/1991 | Yasuda et al. | 455/575 |
| 5,602,432 | 2/1997 | Mizutani | 310/15 |
| 5,656,779 | 8/1997 | Bronowicki | 73/668 |

*Primary Examiner*—Paul Loomis
*Attorney, Agent, or Firm*—Wood, Phillips, VanSanten, Clark & Mortimer

[57] ABSTRACT

An apparatus and method for cooling an electronic device and generating a vibrational signal to alert a user of a particular state of the electronic device. The apparatus includes a motor having a rotor that is rotatable in first and second opposite directions around a first axis, a cooling flow generator, and a vibrational signal generator. The cooling flow generator is operably connected to the rotor to produce a cooling flow in response to rotation of the rotor in at least one of the first and second directions. The vibrational signal generator is operably connected to the rotor to produce a vibrational output of a first magnitude in response to rotation of the rotor in the first direction, and a vibrational output of a second magnitude less than the first magnitude in response to rotation of the rotor in the second direction. The first magnitude is sufficient to generate a vibrational signal that can be sensed by a user to alert the user of a particular state of an electronic device containing the apparatus.

43 Claims, 2 Drawing Sheets

METHOD AND APPARATUS FOR COOLING AN ELECTRONIC DEVICE AND GENERATING A VIBRATIONAL SIGNAL

FIELD OF THE INVENTION

This invention relates to electronic devices and, more particularly, to electronic devices, such as pagers and cellular telephones, that are capable of generating a vibration signal to alert a user to a particular state of the device.

BACKGROUND OF THE INVENTION

The provision of a vibration generator that selectively sends a vibrational signal to alert a user of an incoming call is a desirable feature that is common in conventional cellular telephones and pagers. Typically, the vibration generator consists of a cylindrical DC motor with an eccentric weight attached to the motor shaft. Because the center of mass of the eccentric weight is offset from the motor shaft, a vibrational signal is generated with the motor turned on in response to an incoming call. This vibrational signal is highly desirable for users who frequently find themselves in environments, such as in meetings, where an audible signal would be unacceptable.

One problem associated with some cellular telephones is that the temperature of the telephone's exposed surfaces can become too hot for comfortable use during long calls due to the heat generated by the electronics inside the telephone. Similarly, some cellular telephones may become heated as they are charged, such as in a car cradle. Again, this can make the telephone too hot for comfortable use. While it is known in some electronic devices to provide convection cooling with a fan that passes a cooling air flow over the electronics, attempts to solve the heat management problem in cellular telephones have focused primarily on improving the efficiency of the electronics inside the telephone to prevent the excessive generation of heat. While some success may have been realized through improvements in the efficiency of the electronics, the problem of uncomfortably hot exposed surfaces on some cellular telephones still exists.

SUMMARY OF THE INVENTION

In accordance with the present invention, an apparatus is provided for cooling an electronic device and generating a vibrational signal to alert a user of a particular state of the electronic device. The apparatus includes a motor having a rotor that is rotatable in first and second opposite directions around a first axis, a cooling flow generator, and a vibrational signal generator. The motor is controllable to rotate the rotor in the first direction in response to an input indicating a particular state of an electronic device with which the apparatus is to be interconnected. The cooling flow generator is operably connected to the rotor to produce a cooling flow in response to rotation of the rotor in at least one of the first and second directions. The vibrational signal generator is operably connected to the rotor to produce a vibrational output of a first magnitude in response to rotation of the rotor in the first direction, and a vibrational output of a second magnitude less than the first magnitude in response to rotation of the rotor in the second direction. The first magnitude is sufficient to generate a vibrational signal that can be sensed by a user to alert the user of a particular state of an electronic device with which the apparatus is to be interconnected.

In one form of the invention, the vibrational signal generator includes an eccentric weight and a clutch. The eccentric weight is rotatable around a second axis to generate the vibrational signal. The clutch is operably connected between the rotor and the eccentric weight to transmit a force from the rotor to drive the eccentric weight in rotation around the second axis in response to rotation of the rotor in the first direction, and to prevent transmission of force from the rotor to the first eccentric weight sufficient to cause the eccentric weight to produce the vibrational output of the first magnitude in response to rotation of the rotor in the second direction.

In one form of the invention, the vibrational signal generator includes first and second weights that are repositionable relative to each other between a first relative position wherein the eccentric weights have a combined center of mass located at a radius R1 from a second axis, and a second relative position wherein the eccentric weights have a combined center of mass located at a radius R2 from the second axis that is less than the radius R1. The eccentric weights are operably connected to the rotor to rotate around the second axis in the first relative position in response to rotation of the rotor in the first direction, and to rotate around the second axis in the second relative position in response to rotation of the rotor in the second direction.

In one form of the invention, the apparatus further includes a shaft driven by the rotor and operably connected to the cooling flow generator and the vibrational signal generator. The shaft, the cooling flow generator and the vibrational signal generator are all rotatable around the axis of the rotor.

In one form of the invention, the apparatus is interconnected with an electronic device that includes a receiver adapted to receive an incoming signal to the electronic device. The receiver is operably connected to the motor to command rotation of the rotor in the first direction in response to the incoming signal. In one form, the electronic device is one of a pager and a telephone, and the incoming signal is indicative of an incoming call.

In accordance with one aspect of the invention, a method is provided for cooling an electronic device and generating a vibrational signal to alert a user of a particular state of the electronic device. The method includes the steps of providing a motor having a rotor that is rotatable in first and second opposite directions around an axis, a cooling flow generator, and a vibrational signal generator. The method further includes the step of rotating the rotor in the first direction to drive the cooling flow generator and the vibrational signal generator to produce a cooling flow and a vibrational output of a first magnitude sufficient to generate a vibrational signal that can be sensed by a user to alert the user of a particular state of an electronic device interconnected with the apparatus. The method also includes the step of rotating the rotor in the second direction to drive the cooling flow generator and the vibrational signal generator to produce a cooling flow and a vibrational output of a second magnitude that is less than the first magnitude.

In one form of the invention, a method is provided for cooling an electronic device and generating a vibrational signal and includes the step of providing a motor having a rotor that is rotatable in first and second opposite directions around a first axis, a cooling flow generator, and an eccentric weight that is rotatable around a second axis. The method further includes the step of rotating the rotor in the first direction to drive the cooling flow generator to produce a cooling flow and to drive the eccentric weight in rotation around the second axis to generate a vibrational signal that can be sensed by a user to alert the user of a particular state of an electronic device interconnected with the apparatus. The method also includes the step of rotating the rotor in the second direction to drive the cooling flow generator to produce a cooling flow without driving the eccentric weight at a sufficient rotational speed to produce a vibrational signal that can be sensed by a user to alert the user of a particular state of an electronic device interconnected with the apparatus.

In one form of the invention, a method is provided for cooling an electronic device and generating a vibrational signal and includes the step of providing a motor having a rotor that is rotatable in first and second opposite directions around a first axis, a cooling flow generator, and first and second eccentric weights that are repositionable relative to each other between first and second positions and rotatable around a second axis in the first and second positions relative to each other. The method further includes a step of rotating the rotor in the first direction to drive the cooling flow generator to produce a cooling flow and to drive the first and second weights around the second axis with the first and second weights in the first position to produce a vibrational output having a first magnitude sufficient to generate a vibrational signal that can be sensed by a user to alert the user of a particular state of an electronic device interconnected with the apparatus. The method also includes the step of rotating the rotor in the second direction to drive the cooling flow generator to produce a cooling flow and to drive the first and second weights around the second axis with the first and second weights in the second position to produce a vibrational output having a second magnitude that is less than the first magnitude.

In one form of the invention, the step of rotating the rotor in the second direction includes the steps of sensing a temperature in an electronic device with a temperature sensor, generating a signal at a predetermined temperature sensed by the temperature sensor and rotating the rotor in the second direction in response to the signal from the temperature sensor.

In one form of the invention, the step of rotating the rotor in the second direction includes the steps of monitoring the power level at which an electronic device is powered and the amount of time the electronic device is powered at the power level, generating a signal at a predetermined combination of the monitored power level and time, and rotating the rotor in the second direction in response to the signal.

In one form of the invention, the step of rotating the rotor in the first direction includes the step of rotating the rotor in the first direction in response to an incoming signal to an electronic device. In one form, the incoming signal is indicative of an incoming call to one of a pager and a telephone.

DETAILED DESCRIPTION OF THE PREFERRED EMBODIMENT

Figure 1:
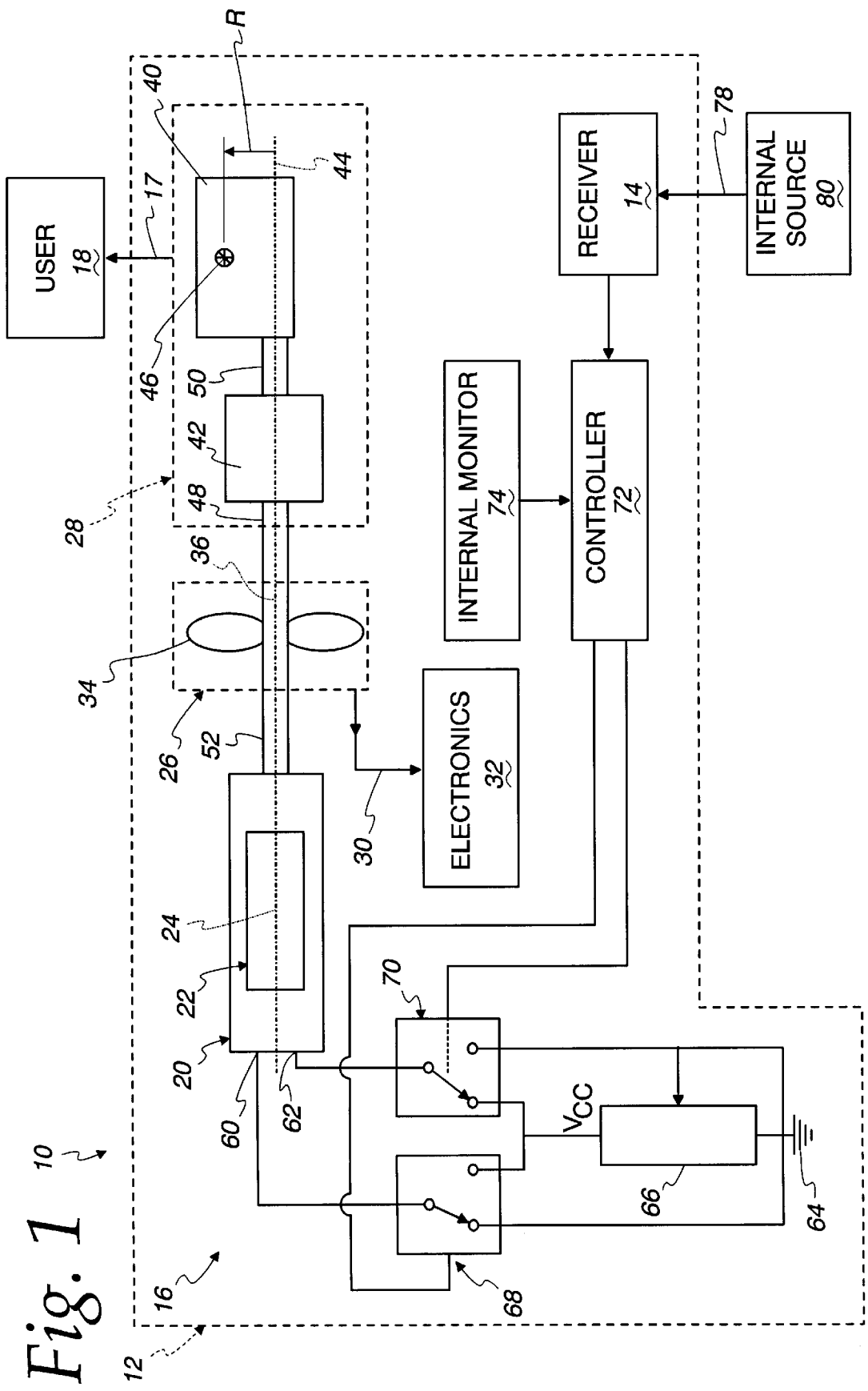
FIG. 1 is a diagrammatic representation of an apparatus embodying the present invention and showing one embodiment of a vibrational signal generator.

Exemplary embodiments of the apparatus made according to the invention are described herein and are illustrated in the drawings in connection with the cooling and user signalling functions for an electronic device 10 in the form of a pager or cellular telephone 12 having a receiver 14 for incoming communication signals. However, it should be understood that the invention may find utility in other applications and that no limitation to use with a pager or cellular telephone 12 is intended.

With reference to FIG. 1, the invention is embodied in an apparatus 16 interconnected with the cellular telephone 12 for cooling the cellular telephone 12 and generating a vibrational signal 17 to alert a user 18 of a particular state of the cellular telephone 12. Typically, the user 18 will be a person carrying on his/her person the cellular telephone 12 and the vibrational signal 17 will alert the user 18 that the cellular telephone 12 is receiving an incoming call. In other words, the vibrational signal 17 alerts the user 18 that the pager or cellular telephone is in the particular state of receiving an incoming call. However, it should be appreciated that the vibrational signal 17 may be used to alert the user 18 of any particular state of the cellular telephone 12, such as the state of having a low battery or the state of being out of service range.

The apparatus 16 includes a motor 20 having a rotor 22 that is rotatable in first and second opposite directions around an axis 24, a cooling flow generator 26, and a vibrational signal generator 28. The cooling flow generator 26 is operably connected to the rotor 22 to produce a cooling flow 30 to at least some of the electronics 32 of the cellular telephone 12. The vibrational signal generator 28 is operably connected to the rotor 22 to produce a vibrational output of a first magnitude in response to rotation of the rotor 22 in the first direction, and a vibrational output of a second magnitude less than the first magnitude in response to rotation of the rotor 22 in the second direction. The first magnitude is sufficient to generate the vibrational signal 17 so that it can be sensed by the user 18 to alert the user of a particular state of the cellular telephone 12.

The cooling flow generator 26 is shown in the form of a fan 34 and is rotatable around an axis 36. Preferably, the fan 34 is driven by the rotor 22 in rotation around the axis 36 whenever the rotor 22 rotates in either the first or second opposite direction around the axis 24.

The embodiment of the vibrational signal generator 28 shown in FIG. 1 includes an eccentric weight 40 and a clutch 42 that are rotatable about an axis 44. The eccentric weight 40 has a center of mass 46 that is offset by a radius R from the axis 44. Because of the offset center of mass 46, rotation of the eccentric weight 40 around the axis 44 at a sufficient rotational speed produces a vibrational output having a magnitude sufficient to generate the vibrational signal 17 that can be sensed by the user 18. The clutch 42 is operably connected between the rotor 22 and the eccentric weight 40 to transmit a force (i.e., torque) from the rotor 22 to drive the eccentric weight 40 in rotation around the axis 44 to produce a vibrational output having a magnitude sufficient to generate the vibrational signal 17 in response to rotation of the rotor in the first direction, and to prevent transmission of force from the rotor to the eccentric weight 40 sufficient to produce a vibrational output having a magnitude sufficient to generate the vibrational signal 17 in response to rotation of the rotor 22 in the second direction.

It will be understood by a person skilled in the art that the magnitude of the vibrational output is dependent upon the mass of the eccentric weight 40, the magnitude of the offset radius R and the rotational speed of the eccentric weight 40 about the axis 44. It will also be understood by a person skilled in the art that numerous factors must be considered in determining what magnitude of vibrational output will be sufficient to be sensed by a user 18 carrying the electronic device 10 so that the user 18 is alerted. These factors may include, for example, the size, mass, structure, and materials of the electronic device 10, the manner or manners in which the user 18 is expected to carry the electronic device 10, and the expected sensitivity of a typical user 18 to vibrations.

Additionally, it will be understood by those skilled in the art that a vibrational output will typically be generated even when the rotor 22 is rotating in the second direction and the clutch 42 is preventing the transmission of force from the rotor 22 to the eccentric weight 40 sufficient to generate the vibrational signal 17 because, in the real world, the rotor 22, the fan 34, and the clutch 42 cannot be perfectly balanced so that their respective center of masses are perfectly centered on their respective axes of rotation 24, 36, and 44. However, it is preferred that the rotating components 22, 34, and 42 of the apparatus 16 have a sufficient level of rotational balance so that, when the rotor 22 rotates in the second direction at any of its design speeds, the magnitude of the vibrational output will be substantially equal to zero such that it will not be readily sensed or detected by a user 18 who is carrying the electronic device 10 in a normal fashion.

Preferably, the clutch 42 is the type commonly referred to as an overrunning, sprag, or one-way clutch in which an input shaft 48 transmits a driving torque to an output shaft 50 when the input shaft 48 is rotated in a first direction around the axis 44, but does not transmit a driving torque to the output shaft 50 when the input shaft 48 is rotated in the opposite direction around the axis 44. However, it should be understood that the invention contemplates other types of clutches, including controllable clutches that engage and disengage the shafts 48, 50 in response to a control input.

Preferably, the axes 24, 36 and 44 are coaxial. Similarly, it is preferred that the apparatus 16 include a shaft 52 that is driven by the rotor 22 and operably connected to the fan 34 and the input shaft 48 of the clutch 42. In one very compact embodiment, the shaft 52 acts as the axle for the fan 34 and forms the input shaft 48 and at least part of the rotor 22.

Preferably, the motor 20 is a DC motor that will turn the rotor 22 in either the first or second direction based upon the polarity of the voltage applied to motor input terminals 60, 62 which are connected to a ground 64 and a power source 66 through a pair of switches 68 and 70. Thus, for example, if the switch 68 is connected to ground 64 and the switch 70 is connected to the power source 66, the rotor 22 will turn in the first direction. Alternatively, if the switch 68 is connected to the power source 66 and the switch 70 is connected to ground 64, the rotor 22 will rotate in the second direction.

It is also preferred that the apparatus 16 include a controller 72 and an internal monitor or monitors 74. The controller 72 controls the direction of rotation of the rotor 22 through the switches 68, 70 in response to input signals from the internal monitors 74 and the receiver 14 of the cellular telephone 12. The internal monitors 74 send an input signal to the controller 72 indicating that the temperature of the cellular telephone 12 has exceeded a predetermined threshold and therefore the cooling flow 30 is required. The receiver 14 sends an input signal to the controller 72 indicating that a vibrational signal 17 is required whenever the receiver 14 receives an incoming signal 78 that is indicative of an incoming call from an external source 80.

In one preferred embodiment, the internal monitors 74 include a temperature sensor that is placed in an appropriate location in the cellular telephone 12 to detect a maximum temperature. Typically, the temperature sensor would most likely be placed on or near the power amplifier of the cellular telephone 12.

In another preferred embodiment, the internal monitors 74 monitor the power level at which the cellular telephone 12 is powered and the amount of time the cellular telephone 12 is powered at the power level. This information is then input into the controller 72 which infers whether the temperature rise in the cellular telephone 12 has exceeded the predetermined threshold based upon a predetermined combination of the monitored power level and time.

It should be understood that the invention also contemplates that the internal monitors 74 may monitor other states of the pager or cellular telephone 12, such as a low battery state or an out of service range state. In such a case, the internal monitor(s) 74 may provide an input to the controller 72 to indicate that a vibrational signal 17 is required to alert the user 18 of the particular state.

In operation, the controller 72 sets the switches 68, 70 to rotate the rotor in the second direction whenever the input from the internal monitors 74 indicate that the temperature of the cellular telephone 12 has exceeded a predetermined threshold and the input from the receiver 14 indicates that the vibrational signal 17 is not required. This produces the cooling flow 30 from the fan 34 to the electronics 32 without producing a vibrational signal 17 to the user 18. Alternatively, the controller 72 sets the switches 68, 70 to rotate the rotor 22 in the first direction whenever the input from the receiver 17 indicates that an incoming signal 78 has been received that is indicative of an incoming call. This produces the cooling flow 30 from the fan 34 to the electronics 32 and a vibrational signal 17 from the eccentric weight 40 to the user 18. Similarly, whenever the inputs from the internal monitors 74 and the receiver 14 indicate that both the cooling flow 30 and the vibrational signal 17 are required, the controller sets the switches 68, 70 to rotate the rotor in the first direction. Finally, when the inputs from the internal monitors 74 and the receiver 76 indicate that neither the vibrational signal 17 nor the cooling flow 30 is required, the controller 72 turns the motor 20 off by setting the switches 68, 70 to ground 64.

Figure 2:
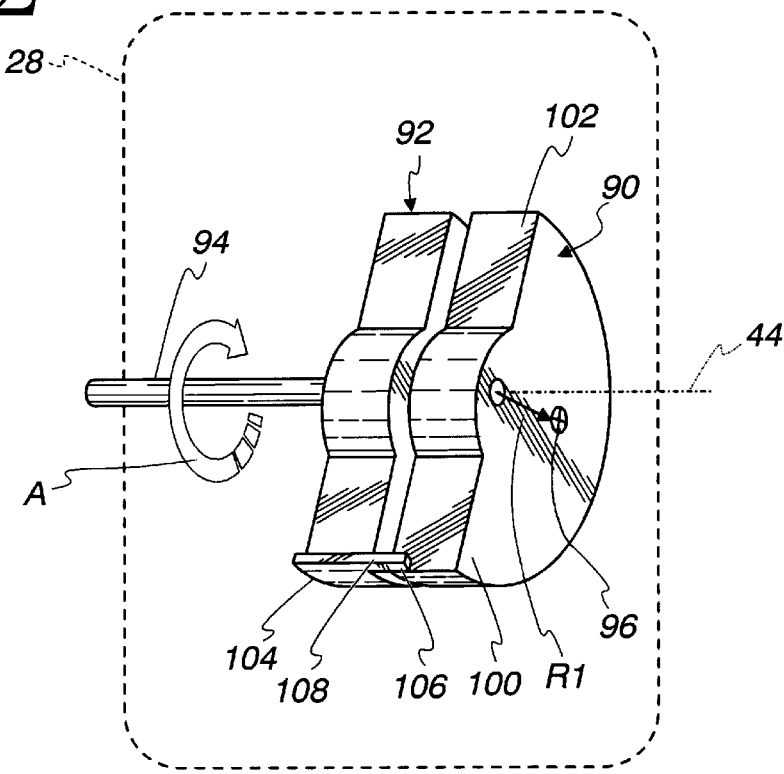
FIG. 2 is a perspective view of a second embodiment of a vibrational signal generator according to the invention, with the vibrational signal generator shown in a first state.
Figure 3:
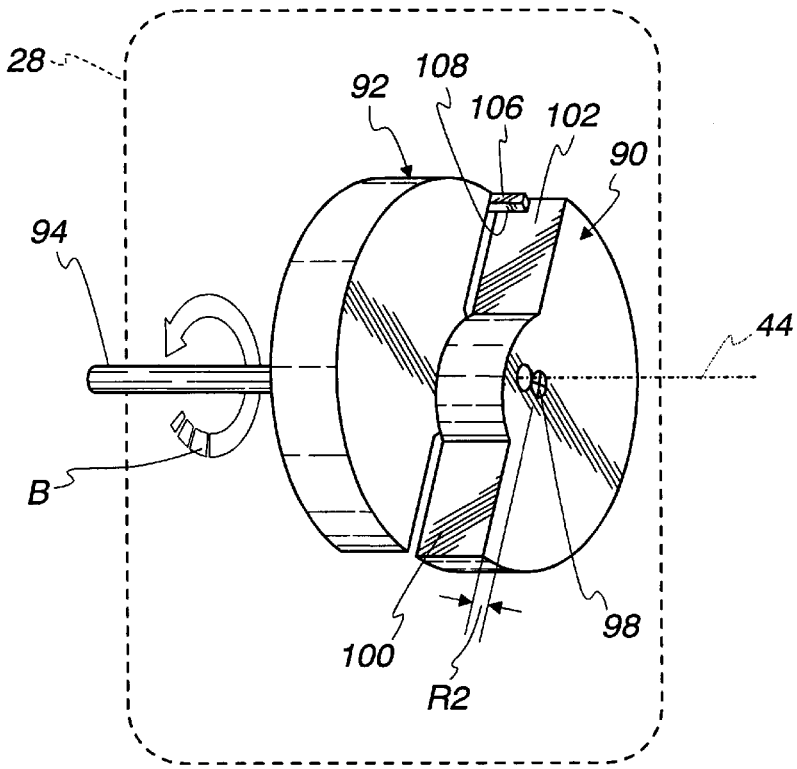
FIG. 3 is a perspective view of the vibrational signal generator shown in FIG. 2, with the vibrational signal generator shown in a second state.

A second embodiment of the vibrational signal generator 28 is shown in FIGS. 2 and 3. In this embodiment, the vibrational signal generator 28 includes a first eccentric weight 90, a second eccentric weight 92, and a drive shaft 94. The first and second eccentric weights 90, 92 are repositionable relative to each other between a first relative position shown in FIG. 2 and a second relative position shown in FIG. 3. In the first relative position show in FIG. 2, the eccentric weights 90, 92 have a combined center of mass 96 located at a radius R1 from the axis 44. In the second relative position, the eccentric weights 90, 92 have a combined center of mass 98 located at a radius R2 that is less than the radius R1 from the axis 44. Preferably, the radius R2 is substantially equal to zero. The eccentric weights 90, 92 are operably connected to the rotor 22 to rotate around the axis 44 in the first position in the direction indicated by arrow A in FIG. 2 in response to rotation of the rotor 22 in the first direction. This generates a vibrational output having a magnitude sufficient to generate the vibrational signal 17 to alert the user 18 of a particular state of the cellular telephone 10. The eccentric weights 90, 92 are operably connected to the rotator 22 to rotate around the axis 44 in the second position in the direction indicated by arrow B in FIG. 3 in response to rotation of the rotor 22 in the second direction. This generates a vibrational output having a magnitude that is less than the magnitude of the vibrational output generated by rotation of the eccentric weights 90, 92 in the first position. Preferably, as previous discussed, the second magnitude is substantially zero so that it will not be readily sensed or detected by a user 18 who is carrying the electronic device 10 in a normal fashion.

To maintain the eccentric weights 90, 92 in the first and second positions, the eccentric weight 90 is provided with surfaces 100 and 102, and the eccentric weight 92 is provided with a tab 104 having surfaces 106 and 108. The eccentric weight 90 is fixed to the shaft 94 to rotate with the shaft 94. This may be achieved with a friction fit between the eccentric weight 90 and the shaft 94. The eccentric weight 92 is journaled on the shaft 94 so that it may rotate relative to the shaft 94. The surface 100 engages the surface 106 to maintain the eccentric weights 90, 92 in the first position and drive the eccentric weight 92 in rotation when the shaft 94 is rotated in the direction of arrow A by rotation of the rotor 22 in the first direction. The surface 102 engages the surface 108 to maintain the eccentric weights 90, 92 in the second position and drive the eccentric weight 92 in rotation when the shaft 94 is rotated in the direction of arrow B by rotation of the rotor 22 in the second direction.

For this embodiment of the vibrational signal generator 28, it should be appreciated that, in all other respects, the operation of the apparatus 16 is the same as the operation with the vibrational signal generator 28 shown in FIG. 1.

From the foregoing, it should be appreciated that by selectively driving the cooling flow generator 26 and the vibrational signal 28 with a single motor 20, the apparatus 16 can provide both the cooling and vibrational signal functions for an electronic device 10, such as the pager or cellular telephone 12, with a minimal number of components and complexity.

I claim:

1. An apparatus for cooling an electronic device and generating a vibrational signal to alert a user of a particular state of the electronic device, the apparatus comprising:
    a motor having a rotor that is rotatable in first and second opposite directions around a first axis, the motor being controllable to rotate the rotor in the first direction in response to an input indicating a particular state of an electronic device with which the apparatus is to be interconnected;
    a cooling flow generator that is operably connected to the rotor to produce a cooling flow in response to rotation of the rotor in at least one of the first and second directions; and
    a vibrational signal generator that is operably connected to the rotor to produce
        a) a vibrational output of a first magnitude in response to rotation of the rotor in the first direction, the first magnitude being sufficient to generate a vibrational signal that can be sensed by a user to alert the user of a particular state of an electronic device with which the apparatus is to be interconnected, and
        b) a vibrational output of a second magnitude less than the first magnitude in response to rotation of the rotor in the second direction.

2. The apparatus of claim 1 wherein the second magnitude is substantially zero.

3. The apparatus of claim 1 further comprising a shaft driven by the rotor and operably connected to the cooling flow generator and the vibrational signal generator, and wherein the shaft, the cooling flow generator, and the vibrational signal generator are rotatable around the axis of the rotor.

4. The apparatus of claim 1 wherein the motor comprises a D.C. motor.

5. The apparatus of claim 1 wherein the cooling flow generator comprises a fan that is rotatable around an axis.

6. The apparatus of claim 1 wherein the vibrational signal generator comprises a first eccentric weight that is rotatable around a second axis.

7. The apparatus of claim 6 wherein the vibrational signal generator further comprises a second eccentric weight that is rotatable around the second axis.

8. The apparatus of claim 6 wherein second axis is coaxial with the first axis.

9. The apparatus of claim 6 wherein the vibrational signal generator further comprises a clutch operably connected to the rotor to:
    a) transmit a first force from the rotor to the first eccentric weight to produce the vibrational output of the first magnitude in response to rotation of the rotor in the first direction; and
    b) prevent transmission of force from the rotor to the first eccentric weight sufficient to cause the eccentric weight to produce the vibrational output of the first magnitude in response to rotation of the rotor in the second direction.

10. The apparatus of claim 1 in combination with an electronic device with which the apparatus is interconnected, the electronic device comprising a receiver adapted to receive an incoming signal to the electronic device, the receiver operably connected to the motor to command rotation of the rotor in the first direction in response to the incoming signal.

11. The combination of claim 10 wherein the electronic device is one of a pager and a telephone, and the incoming signal is indicative of an incoming call.

12. An apparatus for cooling an electronic device and generating a vibrational signal to alert a user of a particular state of the electronic device, the apparatus comprising:
    a motor having a rotor that is rotatable in first and second opposite directions around a first axis, the motor being controllable to rotate the rotor in the first direction in response to an input indicating a particular state of an electronic device with which the apparatus is to be interconnected;
    a cooling flow generator operably connected to the rotor to produce a cooling flow in response to rotation of the rotor in at least one of the first and second directions;
    an eccentric weight that is rotatable around a second axis to generate a vibrational signal that can be sensed by a user to alert the user of a particular state of an electronic device with which the apparatus is to be interconnected; and
    a clutch operably connected between the rotor and the eccentric weight to
        a) transmit a force from the rotor to drive the eccentric weight in rotation around the second axis in response to rotation of the rotor in the first direction, and
        b) prevent transmission of force from the rotor to the first eccentric weight sufficient to cause the eccentric weight to produce the vibrational output of the first magnitude in response to rotation of the rotor in the second direction.

13. The apparatus of claim 12 wherein the clutch is an overrunning clutch.

14. The apparatus of claim 12 wherein the cooling flow generator comprises a fan that is rotatable around a third axis.

15. The apparatus of claim 14 wherein the first, second, and third axes are coaxial.

16. The apparatus of claim 12 in combination with an electronic device with which the apparatus is interconnected, the electronic device comprising a receiver adapted to receive an incoming signal to the electronic device, the receiver operably connected to the motor to command rotation of the rotor in the first direction in response to the incoming signal.

17. The combination of claim 16 wherein the electronic device is one of a pager and a telephone, and the incoming signal is indicative of an incoming call.

18. An apparatus for cooling an electronic device and generating a vibrational signal to alert a user of a particular state of the electronic device, the apparatus comprising:
   a motor having a rotor that is rotatable in first and second opposite directions around a first axis, the motor being controllable to rotate the rotor in the first direction in response to an input indicating a particular state of an electronic device with which the apparatus is to be interconnected;
   a cooling flow generator operably connected to the rotor to produce a cooling flow in response to rotation of the rotor in at least one of the first and second directions;
   first and second eccentric weights repositionable relative to each other between
      a) a first relative position wherein the eccentric weights have a combined center of mass located at a radius R1 from a second axis, and
      b) a second relative position wherein the eccentric weights have a combined center of mass located at a radius R2 from the second axis that is less than the radius R1,
   the eccentric weights operably connected to the rotor to
      a) rotate around the second axis in the first relative position in response to rotation of the rotor in the first direction, and
      b) rotate around the second axis in the second relative position in response to rotation of the rotor in the second direction.

19. The apparatus of claim 18 wherein R2 is substantially zero.

20. The apparatus of claim 18 wherein the cooling flow generator comprises a fan that is rotatable around a third axis.

21. The apparatus of claim 20 wherein the first, second, and third axes are coaxial.

22. The apparatus of claim 18 wherein the second eccentric weight is spaced from the first eccentric weight along the second axis.

23. The apparatus of claim 18 wherein first eccentric weight has first and second surfaces and the second eccentric weight has third and fourth surfaces, the first surface is engageable with the third surface, in response to rotation of the rotor in the first direction to maintain the eccentric weights in the first relative position, and the second surface is engageable with the fourth surface in response to rotation of the rotor in the second direction to maintain the eccentric weights in the second relative position.

24. The apparatus of claim 18 in combination with an electronic device with which the apparatus is interconnected, the electronic device comprising a receiver adapted to receive an incoming signal to the electronic device, the receiver operably connected to the motor to command rotation of the rotor in the first direction in response to the incoming signal.

25. The combination of claim 24 wherein the electronic device is one of a pager and a telephone, and the incoming signal is indicative of an incoming call.

26. A method for cooling an electronic device and generating a vibrational signal to alert a user of a particular state of the electronic device, the method comprising the steps of:
   providing a motor having a rotor that is rotatable in first and second opposite directions around an axis, a cooling flow generator, and a vibrational signal generator;
   rotating the rotor in the first direction and thereby driving the cooling flow generator and the vibrational signal generator to produce a cooling flow and a vibrational output of a first magnitude sufficient to generate a vibrational signal that can be sensed by a user to alert the user of a particular state of an electronic device interconnected with the apparatus; and
   rotating the rotor in the second direction and thereby driving the cooling flow generator and the vibrational signal generator to produce a cooling flow and a vibrational output of a second magnitude that is less than the first magnitude.

27. The method of claim 26 wherein the second magnitude is substantially zero.

28. The method of claim 26 wherein the step of rotating the rotor in the second direction comprises the steps of:
   sensing a temperature in the electronic device with a temperature sensor;
   generating a signal at a predetermined temperature sensed by the temperature sensor; and
   rotating the rotor in the second direction in response to the signal from the temperature sensor.

29. The method of claim 26 wherein the step of rotating the rotor in the second direction comprises the steps of:
   monitoring the power level at which an electronic device is powered and the amount of time the electronic device is powered at the power level;
   generating a signal at a predetermined combination of the monitored power level and time; and
   rotating the rotor in the second direction in response to the signal.

30. The method of claim 26 wherein the step of rotating the rotor in the first direction comprises the step of rotating the rotor in the first direction in response to an incoming signal to the electronic device.

31. The method of claim 30 wherein the incoming signal is indicative of an incoming call to one of a pager and a telephone.

32. A method for cooling an electronic device and generating a vibrational signal to alert a user of a particular state of the electronic device, the method comprising the steps of:
   providing a motor having a rotor that is rotatable in first and second opposite directions around a first axis, a cooling flow generator, and an eccentric weight that is rotatable around a second axis;
   rotating the rotor in the first direction and thereby driving the cooling flow generator to produce a cooling flow and to drive the eccentric weight in rotation around the second axis to generate a vibrational signal that can be sensed by a user to alert the user of a particular state of an electronic device interconnected with the apparatus; and
   rotating the rotor in the second direction and thereby driving the cooling flow generator to produce a cooling flow without driving the eccentric weight at a sufficient rotational speed to produce a vibrational signal that can be sensed by a user to alert the user of a particular state of an electronic device interconnected with the apparatus.

33. The method of claim 32 wherein the first and second axes are coaxial.

34. The method of claim 32 wherein the step of rotating the rotor in the second direction comprises the steps of:

sensing a temperature in the electronic device with a temperature sensor;

generating a signal at a predetermined temperature sensed by the temperature sensor; and rotating the rotor in the second direction in response to the signal from the temperature sensor.

35. The method of claim 32 wherein the step of rotating the rotor in the second direction comprises the steps of:

monitoring the power level at which an electronic device is powered and the amount of time the electronic device is powered at the power level;

generating a signal at a predetermined combination of the monitored power level and time; and rotating the rotor in the second direction in response to the signal.

36. The method of claim 32 wherein the step of rotating the rotor in the first direction comprises the step of rotating the rotor in the first direction in response to an incoming signal to the electronic device.

37. The method of claim 32 wherein the incoming signal is indicative of an incoming call to one of a pager and a telephone.

38. A method for cooling an electronic device and generating a vibrational signal to alert a user of a particular state of the electronic device, the method comprising the steps of:

providing a motor having a rotor that is rotatable in first and second opposite directions around a first axis, a cooling flow generator, and first and second eccentric weights that are repositionable relative to each other between first and second positions and rotatable around a second axis;

rotating the rotor in the first direction to drive the cooling flow generator to produce a cooling flow and to drive the first and second weights around the second axis with the eccentric weights in the first position to produce a vibrational output having a first magnitude sufficient to generate a vibrational signal that can be sensed by a user to alert the user of a particular state of an electronic device containing the apparatus; and rotating the rotor in the second direction to drive the cooling flow generator to produce a cooling flow and to drive the first and second weights around the second axis with the eccentric weights in the second position to produce a vibrational output having a second magnitude that is less than the first magnitude.

39. The method of claim 38 wherein the second magnitude is substantially zero.

40. The method of claim 38 wherein the step of rotating the rotor in the second direction comprises the steps of:

sensing a temperature in the electronic device with a temperature sensor;

generating a signal at a predetermined temperature sensed by the temperature sensor; and rotating the rotor in the second direction in response to the signal from the temperature sensor.

41. The method of claim 38 wherein the step of rotating the rotor in the second direction comprises the steps of:

monitoring the power level at which an electronic device is powered and the amount of time the electronic device is powered at the power level;

generating a signal at a predetermined combination of the monitored power level and time; and rotating the rotor in the second direction in response to the signal.

42. The method of claim 38 wherein the step of rotating the rotor in the first direction comprises the step of rotating the rotor in the first direction in response to an incoming signal to the electronic device.

43. The method of claim 42 wherein the incoming signal is indicative of an incoming call to one of a pager and a telephone.

* * * * *